Sept. 17, 1935.  L. M. SHERIDAN  2,014,954
SPEED VARIATOR
Filed March 27, 1933  2 Sheets-Sheet 1
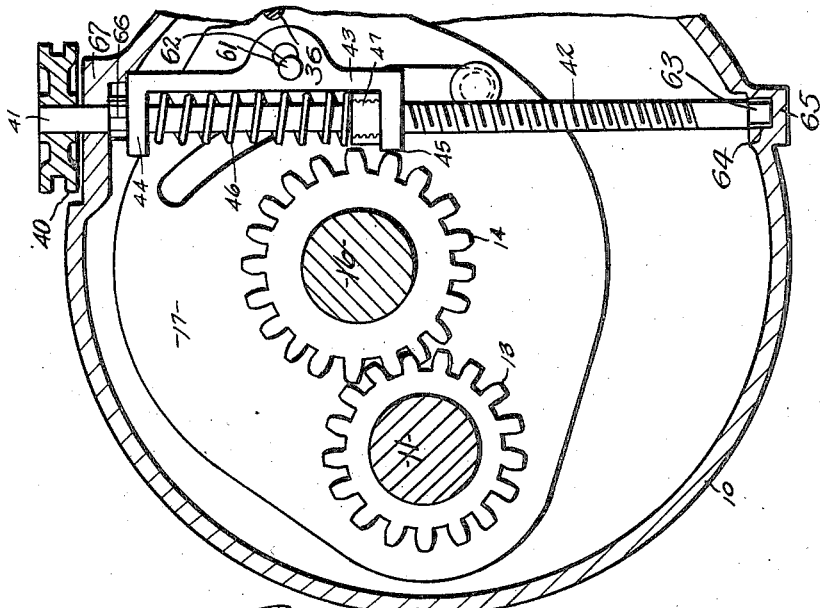
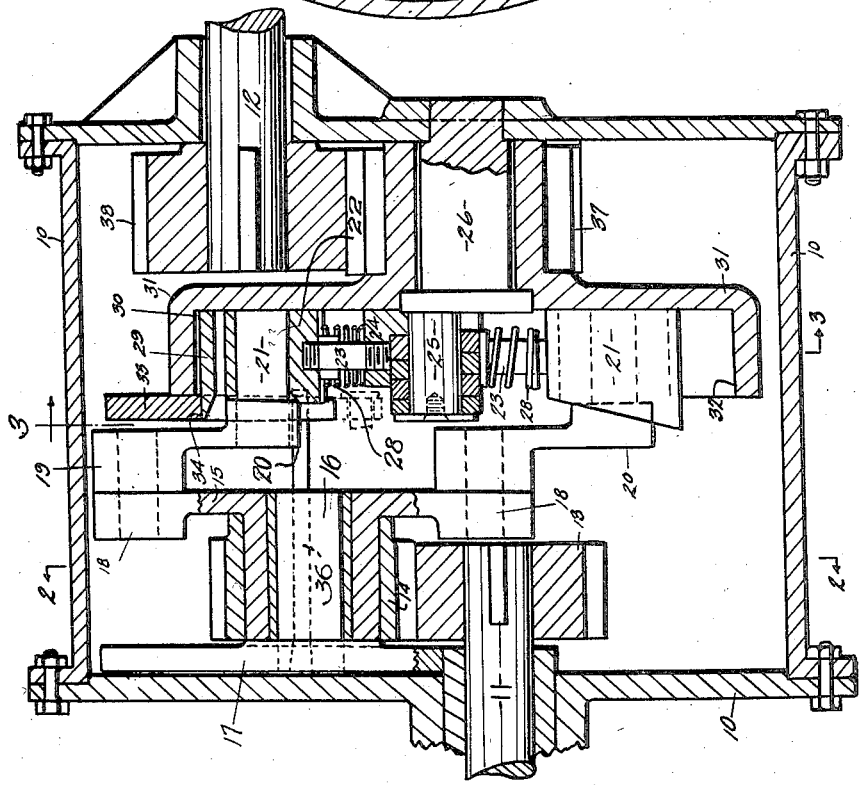
INVENTOR
L. M. Sheridan
By E. J. Netherstonhaugh
ATTORNEY.

Sept. 17, 1935.　　　L. M. SHERIDAN　　　2,014,954

SPEED VARIATOR

Filed March 27, 1933　　　2 Sheets-Sheet 2

INVENTOR
L. M. Sheridan
By E. J. Fetherstonhaugh
ATTORNEY.

Patented Sept. 17, 1935

2,014,954

UNITED STATES PATENT OFFICE 2,014,954

SPEED VARIATOR

Leslie Mitchel Sheridan, Copper Cliff, Ontario, Canada

Application March 27, 1933, Serial No. 662,887

2 Claims. (Cl. 74—112)

The invention relates to a speed variator, as described in the present specification and illustrated in the accompanying drawings which form a part of the same.

The invention consists of a new and novel principle of mechanical application in combination with a speed variator as pointed out broadly and specifically in the claims for novelty following a description containing an explanation in detail of an acceptable form of the invention.

The objects of the invention are to provide a device for the purpose of varying the rotative speeds of a driven shaft in relation to a drive shaft having a fixed speed which provides the power source, this variation in speed being under direct control of the operator; another object is to provide a compact device for the purpose named which will be light in weight in comparison to others in this class which will adapt itself for use on machines heretofore not equipped with variable speed devices; and generally to provide a device of simple parts, durable in construction and efficient for the purpose set forth.

In the drawings, Figure 1 is a vertical section through the housing showing the gear mechanism.

Figure 2 is a cross sectional view taken on lines 2—2 in Figure 1.

Like numerals of reference indicate corresponding parts in the various figures.

Figure 3:
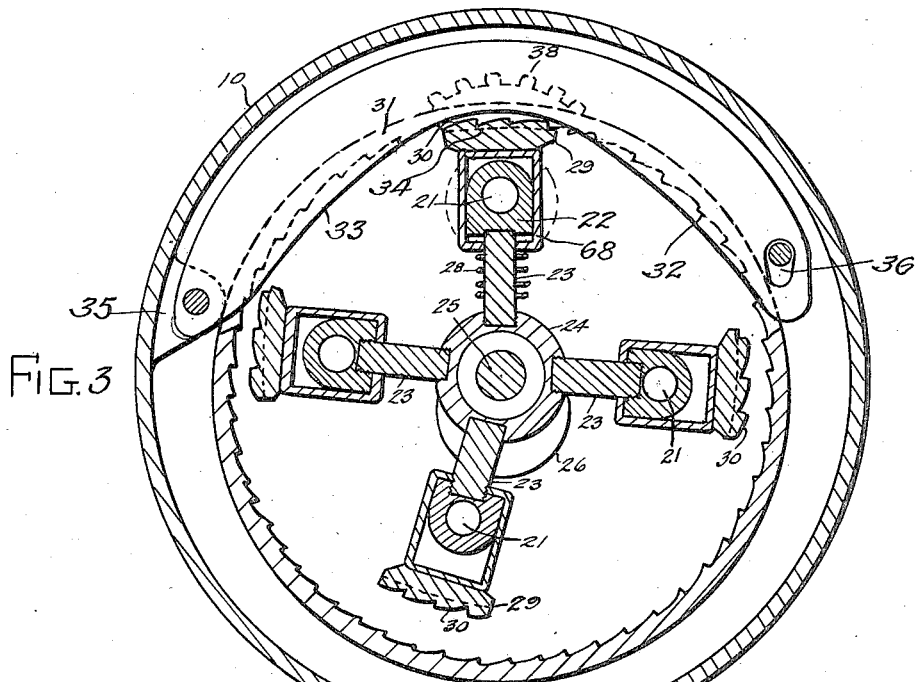
Figure 3 is a cross sectional view taken on lines 3—3 in Figure 1.

Referring to the drawings, the housing 10 completely encloses the entire mechanism and provides a bearing support for the constant speed drive shaft 11 and the variable speed shaft 12. Keyed or attached in any suitable way to the shaft 11 is the gear 13 which co-acts with the gear 14 causing the disc 15 which is an integral part of the gear 14 to revolve, the disc 15 and the gear 14 being integral and mounted on the shaft 16 which is in turn solidly attached to the lever 17 which pivots on and around the shaft 11, the purpose of which will hereinafter be more particularly described.

Attached to the disc 15 are a number of pins 18 upon which one end 19 of the crank shaped levers 20 are attached, while the other end of the crank lever 20 carries the pins 21 to which are journalled the bearings 22 which are connected through the arm 23 to the hub 24 and which in turn are free to revolve around the shaft 25 which is eccentrically located upon the stationary shaft 26.

Mounted on the pawl block retainer 68 and secured thereto are the pawl blocks 29 which are toothed as a gear on their outer surfaces 30. The pawl blocks 29 are held outwardly in position by the springs 28 which engage with the toothed inner surface 32 of the drum 31 which is adapted to rotate around the fixed shaft 26.

The disengaging plate 33 acts to disengage the pawl blocks 29 by pressing down on the projecting position 34 of the pawl blocks 29 and thereby compressing the springs 28. The said disengaging plate 33 is pivoted at one end to the lug 35 of the housing 10 and is connected by the pin 36 to the extended portion of the lever 17.

The disengaging plate 33 only comes into play under certain conditions, that is to say, when it becomes necessary to limit the contact of the pawl blocks 29 with the drum 31. This is accomplished when the plate 33 automatically forces down on the projecting portions of the pawl blocks and by compressing the aforementioned springs 28 and thus prevents the blocks 29 from coming into contact with the toothed drum 31 at that particular position of rotation.

The fixed shaft 26 supports the gear 37 which is in mesh with the gear 38 mounted rigidly on the variable speed shaft 12 and these gears 37 and 38 transfer the rotation of the drum 31 to the shaft 12 which provides the source of variable speed for the particular mechanism which is to be driven.

It will be seen that the lever 17 is used for varying the speed of the driven shaft 12, and carries the shaft 16 and the gear 14 and the disc 15 which is an integral part of the gear 14, and the whole of which pivots around the drive shaft 11.

The pin 61 is rigidly fastened to lever 17 and projects through the slotted hole 62 in the retaining bracket 43, between the shoulders 44 and 45 of the retaining holes in said shoulders 44 and 45 and through the spring 46 passes the shaft 41. The shaft 41 is threaded for a portion of its length 42 and carries the non-rotating nut 47 which bears against the lower end of the spring 46. The lower end of the shaft 41 is turned down at 63 and is fitted into the bearing 64 which is formed of a boss 65 on the housing 10 and the shaft is held in position by the set collar 66 which is pinned to the shaft and which bears against the shoulder 67 of the housing 10, the shaft 41 is operated by the handwheel 48 which is pinned to the shaft 41 and which is located on the outside of the housing 10.

Upon turning the handwheel 40 the nut 47 mounted on the threaded portion of the shaft 42 travels up or down the shaft as the case may be and moves the bracket 43 which in turn moves the lever 17 by bearing against the spring 46 in the upward movement and against the shoulder 45 in the downward movement.

The purpose of the spring 46 is to translate the pressure on the teeth of the driving gear 13 into load torque, this pressure will, when the driving shaft is rotated counterclockwise in Figure 2, cause the spring 46 to be compressed, under a predetermined pressure, and with a consequent shifting of the centre of the shaft 16, and thus automatically lower the speed and increase the torque on the driven shaft 12, to meet the requirements of the increased load, which has caused the said increase in said pressure on the gear teeth of gear 13.

This has the effect of raising or lowering the centre of the disc 15, and which in turn has the effect of increasing or decreasing the speed of rotation of the pawl blocks 29 at their points of contact within the drum 31, which in conjunction with the gearing mechanism has the effect of speeding up or slowing down the variable speed shaft 12.

The disc 15 which carries the levers 20, is concentrically mounted on shaft 16, and when the centre of the shaft 16 is raised, the toothed pawl blocks are caused to rotate at a lower rate of speed at and through the arc of engagement with the drum 31 which has the effect of decreasing the speed of the driven shaft.

When the centre of the shaft 16 is lowered to a position approaching the centre of rotation of the toothed pawl blocks or that of the centre of shaft 25, the pawl blocks 29 will naturally be forced to travel at an increased rotative speed through the arc of contact with the drum 31, until the centres of rotation of the shafts 16 and 25 coincide in which case the rotative speed of the disc 15 and the drum 31 will be the same.

A further lowering of the centre of the shaft 16 will cause the toothed pawl blocks to rotate at a greater speed at their arc of contact with the drum 31, and through the gears 37 and 38 the driven shaft 12 will be caused to rotate at a greater speed than the gears 14, and 16, and the driving shaft 11, the raising or lowering of the said shaft 16 having the effect of lengthening or shortening the radius of rotation of the toothed pawl blocks 29, at and through the arc of contact with the drum 31, and consequently changing their linear speed.

Figure 4:
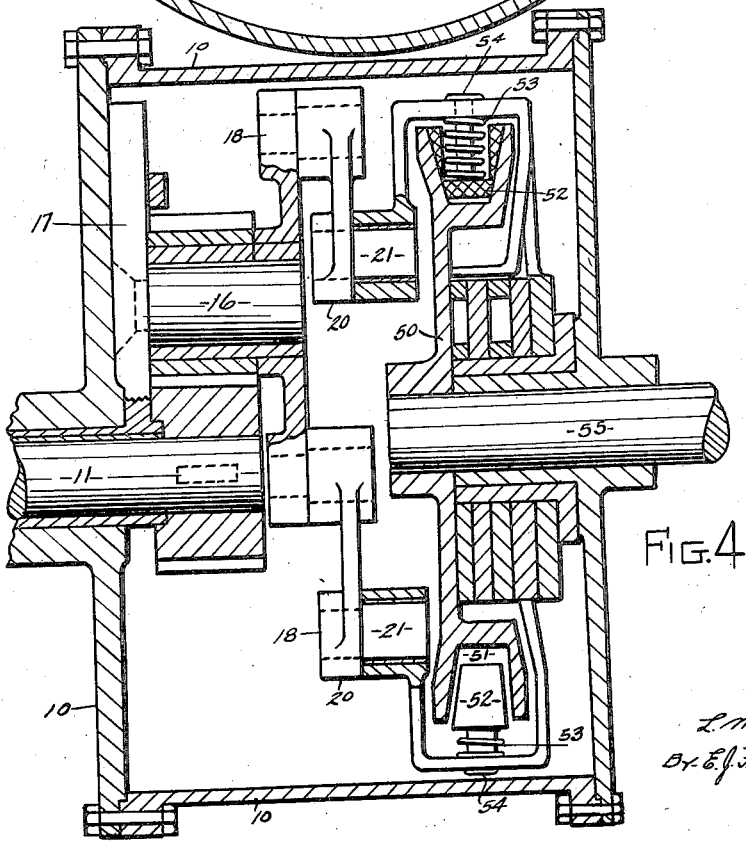
Figure 4 is a vertical sectional view of a modified form of the invention.

In the modified form shown in Figure 4, another construction of the speed variator is disclosed. The results obtained through its use are identical with those of the acceptable form. The main difference in construction is that instead of using the drum 31 and the toothed pawl blocks 29, a pulley shaped drum 50 having a V-shaped slot 51 is used. In this V-slot are the friction blocks 52 which are in engagement with the slot walls, said blocks being rigidly held by the springs and stud 53 and 54 respectively, and it is to be noted that in this instance the variable speed shaft 55 is located centrally in the casing and not off-set as in the acceptable form described previously, and in this case the shaft 55 itself supports the drum 50 and its corresponding mechanism, thusly eliminating gears 37 and 38 as previously described. The friction blocks propelled in an arc by the crank levers attached to the disc are forced into engagement with the V-slot in the drum 50 thus causing shaft 55 to receive at variable speeds. The speed changing mechanism consisting of the lever 17, the hand wheel 40 and corresponding parts are the same as before described in the acceptable form.

In the operation of the toothed type the disc 15 is revolved by the gear 13 on the drive shaft 11 and the gear 14 on the drive shaft 16, the arms 20 which are pivotally mounted on the disc 15 are likewise revolved also, and the arms which in turn carry the toothed pawl blocks 29 drive them around the eccentrically located bearing 25. The drum 31 is toothed on the inner side to engage with the pawl blocks 29 and when the revolving pawls 29 engage with the toothed drum 31 it causes the drum to revolve. The drum 31 is mounted on the stationary shaft 26 and carries on its hub portion, the gear 37 which is in mesh with the gear 38 rigidly secured to the variable speed shaft 12. It is apparent that the pawls will not be in constant engagement with the drum 31 on its entire toothed circumference due to being eccentrically mounted, and the toothed pawls 29 are driven in an eccentric circular path and are in contact with the drum at various points. It will be seen that by shortening or lengthening the radius of rotation of the toothed pawls about the shaft 16 at and through the arc of contact with the drum 31, greater or lesser revolutions will be imparted to the drum which through its revolutions directly controls the variable speed shaft 12.

The speed of the driven pawls 29 is controlled by the lever 17 the movement of which is accomplished through the hand wheel 40 located outside the casing to be turned by the operator. By turning the hand wheel it has the effect of raising or lowering the centre of the disc 15 which controls directly the movements of the driven pawls 29 and to thus increase or decrease the speed of the variable speed shaft 12.

It is of course understood that the applicant does not wish to limit his invention to the exact form as shown, and that various constructional features could be added without in any way departing from the essential features embodied therein.

What I claim is:

1. In speed variators, a drive shaft and a driven shaft suitably journalled, a movable member carried by the driving shaft, an intermediate gear having extending crank arms movable therewith, said intermediate gear being rotatably mounted on a stub shaft fixed to the movable member, a gear mounted on the driving shaft and meshing with the intermediate gear, the latter being capable of being moved with respect to said driving shaft, an internal toothed drum having a gear formed on its hub rotatably mounted on an auxiliary fixed crank shaft, said auxiliary crank shaft having an extension eccentrically formed therewith and having rotatably mounted thereon a plurality of extension arms disposed around the axis of said crank shaft extension, said extension arms having guide blocks secured thereto, lever arms freely connected to said guide blocks and to the extended crank arms of said intermediate gear, an adjustable member suitably secured to a fixed part, said guide blocks having segmental gears movably mounted thereon and adapted to engage the teeth of said internal drum, springs arranged to urge said segmental gears into engagement with said internal drum, a gear mounted on the driven shaft and meshing with said hub gear, said adjustable member tending to prevent contact of said segmental gears with the teeth of said internal toothed drum, and means acting on said movable member for controlling the speed ratio between the driving and driven shafts.

2. In speed variators, a drive shaft and a driven shaft suitably journalled, a movable member carried by said driving shaft, an intermediate gear having crank arms movable therewith rotatably mounted on a stub shaft fixed to said movable member, a gear mounted on the driving shaft and meshing with the intermediate gear, the latter being capable of being moved with respect to the driving shaft, an internal toothed drum having a gear formed on its hub rotatably mounted on an auxiliary fixed crank shaft having an extension eccentrically formed therewith, a hub rotatably mounted on the crank shaft extension and provided with a plurality of extension arms, guide blocks secured to said extension arms, segmental gears movably mounted on the guide blocks, members forming lever arms freely connected to said guide blocks and to the crank arms of the said intermediate gear, springs arranged to urge said segmental gears into engagement with said internal drum, an adjustable member having one end fixed and the other end secured to a pin extending from said movable member, controlling means adapted to control the relative position of said movable member and said adjustable member, said adjustable member tending to prevent contact of said segmental gears with the teeth of said internal drum, and a gear mounted on the driven shaft and meshing with said hub gear.

LESLIE MITCHEL SHERIDAN.